Feb. 18, 1964　　L. E. HOLLANDER, JR., ETAL　　3,121,830
SINGLE-CRYSTAL RUTILE CAPACITOR AND METHOD OF FABRICATION
Filed Oct. 4, 1960

*INVENTORS*
LEWIS E. HOLLANDER, JR.
ROSS A. QUINN
BY
　　*George C. Sullivan*
　　　　　Agent United States Patent Office 3,121,830
Patented Feb. 18, 1964

3,121,830
SINGLE-CRYSTAL RUTILE CAPACITOR AND
METHOD OF FABRICATION
Lewis E. Hollander, Jr., Los Altos Hills, and Ross A.
Quinn, Palo Alto, Calif., assignors to Lockheed Aircraft Corporation, Burbank, Calif.
Filed Oct. 4, 1960, Ser. No. 60,387
2 Claims. (Cl. 317—258)

This invention relates to a single-crystal rutile capacitor and a method of fabrication thereof.

The desirability of obtaining a very thin, single-crystal dielectric layer (of the order of microns) for various purposes, such as in making capacitors for micromolecular applications, is well recognized in the art and there has been considerable effort expended towards this end. Such methods as evaporation, crystal growth techniques and the like have previously been employed, but as far as is now known, none of these previous methods have been completely successful in producing a micron-thin single-crystal layer.

Accordingly, it is the broad object of this invention to provide a method of making a very thin single-crystal layer of the order of microns.

A more specific object of this invention is to provide a method of making a micron-thin single-crystal layer of stoichiometric rutile.

Another object of this invention is to provide a single-crystal rutile capacitor and a method of construction thereof.

A further object of this invention is to provide a single-crystal rutile capacitor for micromolecular applications.

Still another object of this invention is to provide a single-crystal rutile capacitor having a high capacitance per unit area, a high dielectric strength, a low loss figure, and in addition is capable of operation at very high temperatures.

Yet another object of this invention is to provide the methods and constructions of the aforementioned objects in relatively simple and convenient form.

A typical single-crystal rutile capacitor is fabricated in accordance with the invention by first reducing to non-stoichiometric form a thin stoichiometric crystal slab of rutile preferably oriented with its "c" crystallographic axis perpendicular to the faces of the slab, then optically polishing one face of the rutile slab to optical flatness, next anodizing the polished surface to reoxidize a micron-thin stoichiometric surface layer of the slab, and then coating a conductive layer on the thin stoichiometric rutile layer so formed. The resulting capacitor then comprises the non-stoichiometric rutile portion and the coated conductive layer as electrodes and the thin single-crystal stoichiometric rutile layer as the dielectric therebetween. The importance of the method just described is based on the discovery that, by anodizing an optically polished face of non-stoichiometric single-crystal rutile, a thin stoichiometric single-crystal layer of the order of microns can be formed without upsetting the crystal lattice, thereby making it possible to provide a substantially perfect single-crystal layer of the remarkably small thickness of the order of microns, a feat which has heretofore not been possible.

The specific nature of the invention as well as other objects, uses and advantages thereof will clearly appear from the following description and the accompanying drawing in which.

Like numerals designate like elements throughout the figures of the drawing.

Figure 1:
FIGS. 1–3 are cross-sectional views illustrating typical steps in the method of making a single-crystal rutile capacitor prior to anodizing in accordance with the invention.

In FIG. 1, a slab 10 of stoichiometric single-crystal rutile is shown with its "c" crystallographic axis parallel to the faces of the slab 10 as indicated by the similarly designated arrow "c." Such a slab 10 may be obtained by suitably cutting a single crystal from X-ray oriented boules of stoichiometric rutile.

Figure 2:
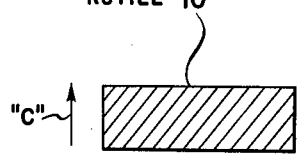

The stoichiometric single-crystal rutile slab 10 of FIG. 1 is then reduced to non-stoichiometric form as indicated at 10' in FIG. 2, which may be accomplished by suitable hydrogen reduction techniques.

Figure 3:
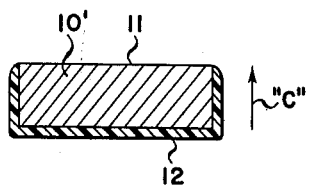

The non-stoichiometric rutile slab 10' of FIG. 2 is then potted in a silicon or epoxy resin coating 12 so that all of its surfaces are covered except one face 11 of the slab 10' as shown in FIG. 3. This uncovered face 11 is then optically polished to optical flatness using conventional optical polishing techniques. A high degree of optical flatness is obtainable, since rutile is capable of taking a high polish.

Figure 4:
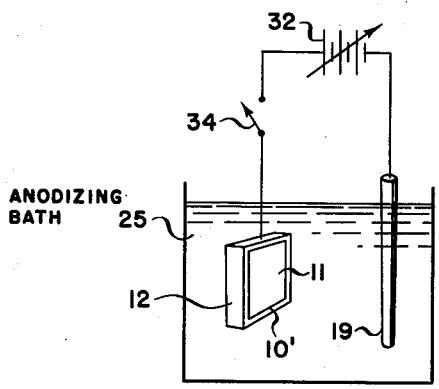
FIG. 4 is a schematic diagram of the anodization of a polished face of a non-stoichiometric single-crystal rutile slab in accordance with the invention.

The slab of FIG. 3 is now subjected to an anodizing treatment as shown in FIG. 4 in a bath 25 chosen so that oxygen is formed at the polished surface 11 of the non-stoichiometric rutile slab 10' during the anodizing process. The silicon or epoxy resin coating 12 protects the other surfaces of the slab 10' from the anodizing treatment. The anodizing circuitry is conventional in that the positive side of an adjustable D.-C. power supply 32 is connected to the rutile slab 10' through an on-off switch 34 to make the slab 10' an anode, and the negative side of the D.-C. power supply 32 is connected to a graphite rod 19 also immersed in the bath 25 and serving as a cathode.

The particular anodizing bath 25 chosen is not critical, and a variety of known anodizing baths can be satisfactorily employed, such as sulphuric acid or acetic acid anodizing baths or anodizing baths containing borates. The important requirement is that oxygen be formed at the polished surface 11 of the rutile slab 10' during the anodizing process. We have discovered that when oxygen is so formed during anodizing the oxygen vacancy in the surface layer 11 of the non-stoichiometric rutile slab 10' is filled in a manner which produces a micron-thin stoichiometric single-crystal layer having a crystal lattice which appears perfect in all respects. This is in contrast to known techniques for obtaining a very thin single-crystal layer of various materials which have great difficulty in even approximating a true crystal lattice.

Figure 5:
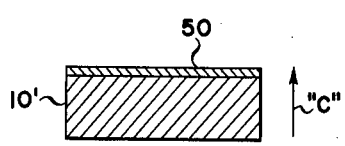
FIG. 5 is a cross-sectional view of a non-stoichiometric single-crystal rutile slab having a micron-thin stoichiometric layer formed thereon by anodizing.

The resulting micron-thin stoichiometric single-crystal rutile layer 50 obtained after anodizing is illustrated in FIG. 5, the thickness shown being exaggerated for illustrative purposes.

One of the important advantages of achieving a micron-thin stoichiometric single-crystal layer of rutile is that rutile not only has a relatively high dielectric constant and dielectric strength, but in addition, is a high temperature material which is capable of satisfactory operation at very high temperatures.

Figure 6:
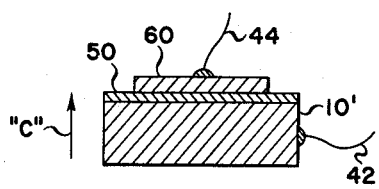
FIG. 6 is a cross-sectional view of the single-crystal rutile capacitor fabricated from the anodized rutile slab of FIG. 5.

A direct application for the stoichiometric single-crystal rutile layer 50 produced is for use as the dielectric of a capacitor as illustrated in FIG. 6. In the construction of such a capacitor, a conductive layer 60 is suitably coated on the single-crystal rutile layer 50 as shown, such as by vacuum deposition, painting, etc. The resulting capacitor then comprises the non-stoichiometric rutile portion 10' and the conductive layer 60 as electrodes and the micron-thin single-crystal stoichiometric rutile layer 50 as the dielectric therebetween. Electrical lead wires 42 and 44 may be soldered to the non-stoichiometric rutile 10' and the conductive layer 60, respectively, to permit convenient connection to be made to the capacitor.

Because the dielectric of the capacitor formed by the micron-thin stoichiometric single-crystal rutile layer 50 is in fact a true single crystal, it can be made very thin so that a high capacitance per unit area can be achieved, while at the same time maintaining the high dielectric strength and low loss characteristics of the capacitor. Also, the high temperature stability of rutile makes possible the operation of a single-crystal rutile capacitor such as shown in FIG. 6 at very high temperatures.

A fuller understanding of the present invention may now be obtained from the following illustrative example. A slab 10 of stoichiometric single-crystal rutile having its "c" axis parallel to the faces of the slab 10 as shown in FIG. 1 is obtained by cutting a single crystal from X-ray oriented boules of stoichiometric rutile of approximately 1/32 inch thickness. This slab 10 is then reduced to non-stoichiometric form (as shown at 10' in FIG. 2) with a resistivity of the order of 0.2 ohm-centimeter by inserting the slab 10 into a quartz-tube oven at a temperature of 800° centigrade and circulating hydrohgen over the slab for about 1 hour. To keep the capacitor series resistance small, the slab 10' should have a resistivity of less than 1 ohm-centimeter.

A lead wire is soldered to an edge of the non-stoichiomertic single-crystal rutile slab 10' which is then potted in an epoxy resin on all surfaces except one face 11 thereof as illustrated in FIG. 3. This face 11 is then highly polished using optical polishing techniques and the slab 10' subjected to anodizing by means of an arrangement such as shown in FIG. 4 using a saturated sodium perborate water solution or a 10% acetic acid water solution as the anodizing bath 25.

The adjustable D.-C. power supply 32 is gradually increased from 0 to 420 volts and a final current of less than five miliamperes in approximately 1 hour to obtain a micron-thin stoichiometric single-crystal rutile layer 50. The protective epoxy 12 is then removed and a silver coating 60 is painted on the stoichiometric single-crystal rutile layer 50 to form a capacitor as illustrated in FIG. 6. Measurements on a number of capacitors so formed indicated a capacitance of 0.14 microfarad per square centimeter is achievable with a parallel resistance across the capacitor of greater than 10 megohms for a 1 x 1 centimeter surface area. The series resistance of the capacitor can be made negligible by decreasing the thickness of the original slab 10 so that the path through the non-stoichiometric rutile 10' is small.

It is to be understood that the method and construction described herein are only exemplary and various modifications and variations are possible without departing from the spirit of this invention. The invention, therefore, is to be considered as including all possible modications and variations coming within the scope of the invention as defined in the appended claims.

We claim as our invention:

1. A method of fabricating a single-crystal rutile capacitor which comprises optically polishing one face of a slab of non-stoichiometric single-crystal rutile having a resistivity of less than 1 ohm-centimeter and a "c" crystallographic axis perpendicular to the faces of said slab, coating the surfaces of said slab except the polished face with protective material, then anodizing the optically polished surface in a saturated sodium perborate water solution, said anodizing starting at zero volts and increasing to a final voltage of the order of 420 volts and a current of the order of 5 milliamperes in approximately 1 hour to form a micron-thin layer of the polished surface into stoichiometric single-crystal rutile, then removing the protective coating from other surfaces of the slab and coating a conductive layer on the micron-thin layer of stoichiometric single-crystal rutile.

2. A single crystal rutile capacitor comprising: a non-stoichiometric single crystal rutile layer having a resistivity of less than one ohm-centimeter, a micron-thin layer of stoichiometric single crystal rutile formed on and within said crystal lattice of said non-stoichiometric single crystal rutile layer, and a conductive layer coated on said micron-thin layer, wherein the "c" crystallographic axis of said non-stoichiometric single crystal layer and the stoichiometric micron-thin layer formed thereon are perpendicular to the faces of said layers.

References Cited in the file of this patent

UNITED STATES PATENTS

| | | |
|---|---|---|
| 2,462,218 | Olsen | Feb. 22, 1949 |
| 2,504,178 | Burnham | Apr. 18, 1950 |
| 2,711,496 | Ruben | June 21, 1955 |
| 2,822,606 | Yoshida | Feb. 11, 1958 |
| 2,841,508 | Roup | July 1, 1958 |
| 2,943,031 | Wainer | June 28, 1960 |
| 2,960,642 | Rudnay | Nov. 15, 1960 |

FOREIGN PATENTS

| | | |
|---|---|---|
| 672,732 | Great Britain | May 28, 1952 |